(12) United States Patent
Devonald

(10) Patent No.: US 7,704,310 B2
(45) Date of Patent: Apr. 27, 2010

(54) TRISAZO-DYES WITH A PYRAZOLYL END GROUP AND THEIR USE IN INK-JET PRINTING

(75) Inventor: David Phillip Devonald, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 0 days.

(21) Appl. No.: 12/444,409

(22) PCT Filed: Sep. 24, 2007

(86) PCT No.: PCT/GB2007/003586

§ 371 (c)(1), (2), (4) Date: Apr. 6, 2009

(87) PCT Pub. No.: WO2008/047071

PCT Pub. Date: Apr. 24, 2008

(65) Prior Publication Data

US 2010/0015411 A1 Jan. 21, 2010

(30) Foreign Application Priority Data

Oct. 19, 2006 (GB) ................................. 0620774.0

(51) Int. Cl.
C09D 11/02 (2006.01)
C09B 35/40 (2006.01)
B41J 2/01 (2006.01)

(52) U.S. Cl. ...................... 106/31.5; 534/754; 347/100

(58) Field of Classification Search ................ 106/31.5, 106/31.52; 534/754, 755, 815; 428/195.1; 347/100
See application file for complete search history.

(56) References Cited

U.S. PATENT DOCUMENTS

| 7,041,161 | B2 * | 5/2006 | Mistry et al. | ............... 106/31.5 |
| 7,052,538 | B2 * | 5/2006 | Mistry et al. | ............... 106/31.5 |
| 7,056,376 | B2 * | 6/2006 | Popat et al. | ............... 106/31.52 |
| 7,465,346 | B2 * | 12/2008 | Fukumoto et al. | ........... 106/31.5 |
| 7,530,685 | B2 * | 5/2009 | Devonald | ..................... 347/100 |
| 2005/0076806 | A1 | 4/2005 | Hanmura et al. | ......... 106/31.48 |
| 2007/0062409 | A1 * | 3/2007 | Mistry et al. | ............... 106/31.5 |
| 2007/0139499 | A1 * | 6/2007 | Yabuki et al. | ............. 106/31.52 |
| 2009/0041939 | A1 * | 2/2009 | Mistry | ......................... 534/754 |
| 2009/0208713 | A1 * | 8/2009 | Mistry et al. | ............. 106/31.52 |

FOREIGN PATENT DOCUMENTS

| FR | 1.054.813 | 2/1954 |
| WO | WO 03/095563 A1 | 11/2003 |
| WO | WO 03/106572 A1 | 12/2003 |
| WO | WO 2004/046252 A1 | 6/2004 |
| WO | WO 2005/121261 A1 | 12/2005 |

* cited by examiner

*Primary Examiner*—Helene Klemanski
(74) *Attorney, Agent, or Firm*—Morgan Lewis & Bockius LLP

(57) ABSTRACT

A compound of Formula (1) or a salt thereof:

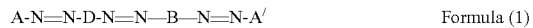

wherein
A is an optionally substituted aryl, heteroaryl, non-aromatic heterocyclic or alkenyl group;
D is an optionally substituted, optionally metallized 1,8-dihydroxynaphthalene group;
B is an optionally substituted organic linking group; and
A′ is an optionally substituted pyrazolyl group which does not have an aromatic group as a substituent directly attached to either of the nitrogen atoms of the pyrazolyl ring.

Also provided are compositions, inks, ink sets, substrates and cartridges all containing the compound or salt and printing processes using the compound or salt. The compounds and salts are especially useful for ink-jet printing.

23 Claims, No Drawings

TRISAZO-DYES WITH A PYRAZOLYL END GROUP AND THEIR USE IN INK-JET PRINTING

This invention relates to azo compounds and their salts, processes for preparing the same, compositions derived therefrom, printing processes using the same, cartridges, printed substrates and ink sets.

Ink jet printing ("IJP") is a non-impact printing technique in which droplets of ink are ejected through a fine nozzle onto a substrate without bringing the nozzle into contact with the substrate. There are many demanding performance requirements for dyes and inks used in IJP. For example, it is desirable that they provide sharp, non-feathered images having good optical density, water-fastness, light-fastness and resistance to fading in the presence of oxidising air pollutants (e.g. ozone). The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

Direct Black 38 and Direct Black 19 are known colorants for ink jet printing. These dyes comprise a 1-amino-8-hydroxynaphthalene unit.

GB 774,612 describes certain blue to bluish red dyes comprising a 1,8-dihydroxynaphthalene group carrying a tris-azo group on one side only. These dyes are described for the conventional dyeing of leather.

U.S. Pat. No. 1,209,154 describes violet dyes for cotton containing a 1,8-dihydroxynaphthalene group carrying a tris-azo group on one side only.

WO 03/106572 describes tris azo dyes for IJP containing a 1,8-dihydroxynaphthalene group.

However, there remains a need for dyes having improvement in one or more of the above performance requirements for IJP, particularly in optical density, light fastness and/or ozone fastness.

In view of the above considerations the present invention has been made. In more detail, in one aspect, the present invention provides a compound of Formula (1) or a salt thereof:

A—N=N-D-N=N—B—N=N-A′   Formula (1)

wherein

A is an optionally substituted aryl, heteroaryl, non-aromatic heterocyclic or alkenyl group;

D is an optionally substituted, optionally metallised 1,8-dihydroxynaphthalene group;

B is an optionally substituted organic linking group; and

A′ is an optionally substituted pyrazolyl group which does not have an aromatic group as a substituent directly attached to either of the nitrogen atoms of the pyrazolyl ring.

In another aspect, the present invention provides a process for printing an image on a substrate comprising applying thereto a composition comprising a liquid medium and a compound of Formula (1) or a salt thereof.

The term image herein includes both a graphic image and text.

Preferably, the composition is applied to the substrate by means of an ink jet printer. The ink jet printer preferably applies the composition to the substrate in the form of droplets which are ejected through a small orifice onto the substrate. Preferred ink jet printers are piezoelectric ink jet printers and thermal ink jet printers. In thermal ink jet printers, programmed pulses of heat are applied to the composition in a reservoir by means of a resistor adjacent to the orifice, thereby causing the composition to be ejected in the form of small droplets directed towards the substrate during relative movement between the substrate and the orifice. In piezoelectric ink jet printers the oscillation of a small crystal causes ejection of the composition from the orifice.

The substrate is preferably paper, plastic, a textile, metal or glass, more preferably a treated substrate such as a coated paper or coated plastic, especially coated paper.

Preferred plain or treated papers are papers which may have an acid, alkaline or neutral character. Examples of commercially available treated papers include: HP Premium Coated Paper™, HP Advanced Photopaper™ Glossy, HP Photopaper™ Glossy, HP Printing Paper, HP new and improved Premium Plus photopaper all available from Hewlett Packard Inc.); Stylus Pro 720 dpi Coated Paper™, Epson Photo Quality Glossy Film™, Epson Photo Quality Glossy Paper™, Epson Premium Photo Paper™, Epson Crispia (all available from Seiko Epson Corp.); Canon HR 101 High Resolution Paper™, Canon GP 201 Glossy Paper™, Canon HG 101 and HG201 High Gloss Film™, Canon PR 101™ (all available from Canon); Kodak Premium Photopaper™, Kodak Premium InkJetpaper™ (available from Kodak); Konica Inkjet Paper QP™ Professional Photo Glossy, Konica Inkjet Paper QP™ Professional Photo 2-sided Glossy, Konica Inkjet Paper QP™ Premium Photo Glossy, Konica Inkjet Paper QP™ Premium Photo Silky™ (available from Konica); Ilford Instant Dry Paper™ (available from Ilford).

Preferably, the compound of Formula (1) or salt thereof carries at least 2 water-solubilising groups, e.g. sulpho groups, more preferably 2 to 10 sulpho groups, still more preferably 2 to 6 sulpho groups, especially 2 to 4 sulpho groups. In various embodiments the compound of Formula (1) or salt thereof carries 2, 3, 4, 5, 6, 7, 8, 9 or 10 sulpho groups.

Preferred optionally substituted aryl groups represented by A are optionally substituted phenyl and naphthyl, especially phenyl.

Preferred optionally substituted heteroaryl groups and non-aromatic heterocyclic groups represented by A comprise a heterocycle or substituted heterocycle comprising a 5 to 7 membered ring, preferably comprising at least one double bond.

Preferred optionally substituted alkenyl groups represented by A are of Formula (2):

Formula (2)

wherein:

Y is an electron withdrawing group;

$Y^1$ is H, alkyl or aryl, OR or $N(R)_2$ in which each R independently is H, optionally substituted alkyl or optionally substituted aryl; or, Y and $Y^1$ together with the double bond shown above form a 5- or 6-membered ring; and $X^1$ is a group which comprises at least one heteroatom selected from N, O and S (preferably N and O).

In any groups where there is more than one R group (e.g. $N(R)_2$ or $SO_2N(R)_2$), each R may be the same or different.

Y is preferably selected from CN, $CO_2H$, $CO_2R$, $CON(R)_2$, COR and $-SO_2N(R)_2$ in which each R is independently defined as above. When R is optionally substituted alkyl it is preferably optionally substituted $C_{1-8}$ alkyl, more preferably optionally substituted $C_{1-4}$ alkyl. When R is optionally substituted aryl it is preferably optionally substituted phenyl or naphthyl, more preferably optionally substituted phenyl. When R is optionally substituted alkyl or aryl optional substituents are preferably selected from water solubilising groups, particularly sulpho (i.e. $SO_3H$), sulphonamido (i.e. $SO_2N(R)_2$), carboxy (i.e. $CO_2H$) or phosphato (i.e. $PO_3H_2$).

When $Y^1$ is alkyl it is preferably $C_{1-8}$ alkyl, more preferably $C_{1-4}$ alkyl. When $Y^1$ is aryl it is preferably phenyl. When Y and $Y^1$ are joined together to form a 5- or 6-membered ring it is preferably an optionally substituted pyrazolone or triazole ring, more preferably pyrazolone or 1,3,4-triazole.

$X^1$ is preferably OR, $CO_2R$ or $N(R)_2$.

More preferably Y is $CO_2R^1$, $Y^1$ is $OR^1$ and $X^1$ is $OR^1$ wherein each $R^1$ independently is H or $C_{1-4}$ alkyl.

Most preferably, A is optionally substituted aryl as described above.

One or more optional substituents which may be present on A, B and A' are preferably selected, independently, from OH; $SO_3H$; $PO_3H_2$; $CO_2H$; $NO_2$; CN; halo; optionally substituted alkyl (especially optionally substituted $C_{1-4}$ alkyl where one or more optional substituents are preferably selected from sulpho, carboxy, phosphate, $C_{1-4}$ alkoxy, amino and hydroxy group); optionally substituted cycloalkyl (especially $C_{6-12}$-cycloalkyl where one or more optional substituents are preferably selected from sulpho, carboxy, phosphate, $C_{1-4}$ alkoxy, amino and hydroxy group); optionally substituted alkoxy (especially optionally substituted $C_{1-4}$ alkoxy where one or more optional substituents are preferably selected from a sulpho, carboxy, phosphate, $C_{1-4}$ alkoxy, $C_{1-4}$ alkyl, amino and hydroxy group); optionally substituted aryl (especially optionally substituted phenyl or naphthyl where one or more optional substituents are preferably selected from sulpho, carboxy, phosphato, $C_{1-4}$ alkoxy, amino and hydroxy group); optionally substituted aryloxy (especially optionally substituted phenoxy where one or more optional substituents are preferably selected from sulpho, carboxy, phosphate, $C_{1-4}$ alkoxy, amino and hydroxy group); optionally substituted heteroaryl; optionally substituted amine (especially where N is substituted with one or two $C_{1-4}$ alkyl groups optionally carrying a sulpho, carboxy, phosphate, $C_{1-4}$ alkoxy, amino or hydroxy group, or where N is substituted with one or two acyl groups, preferably $C_{1-4}$-acyl groups); COOR; OCOOR; OCOR; COR; $CON(R)_2$; $OCON(R)_2$; SR; $SO_2R$; $SO_2N(R)_2$; and optionally substituted azo (especially optionally substituted phenylazo, naphthylazo and heteroarylazo where the phenyl, naphthyl and heteroaryl groups thereof are optionally further substituted with one or more groups selected from OH, $SO_3H$, $PO_3H_2$, $CO_2H$, $NO_2$ and $NH_2$).

Preferably, A and B each independently carry from zero to three substituents, more preferably one or two substituents.

Preferred substituents for A and B are selected from OH; $SO_3H$; $SO_2N(R)_2$; $PO_3H_2$; $CO_2H$; $CONH_2$; $NO_2$; CN; halo; optionally substituted alkyl, optionally substituted alkoxy and optionally substituted amine.

Preferably, A carries at least one sulpho group, more preferably one or two sulpho groups and especially one sulpho group.

As examples of optionally substituted phenyl and naphthyl groups represented by A there may be mentioned 2-sulfo-4-aminophenyl, 2-sulfo-4-nitrophenyl, 2-hydroxy-4-aminophenyl and 1-hydroxy-3-sulpho-6-aminonaphthyl. As examples of optionally substituted heteroaryl groups represented by A there may be mentioned optionally substituted pyridyl, pyrazolyl or 1,2,4-triazole.

A preferred group represented by D is of Formula (3) or a metal complex thereof:

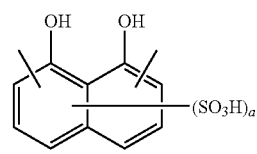

Formula (3)

wherein a is 1 or 2. More preferably, a is 2 and the $SO_3H$ groups shown in Formula (3) are in the 3- and 6-positions or the 3- and 5-positions.

Accordingly, in a more preferred aspect of the invention, D is of Formula (4) or a metal complex thereof:

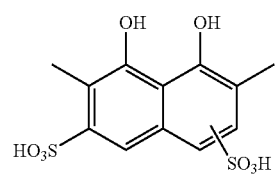

Formula (4)

More preferably still, D is of Formula (5) or (6) or a metal complex thereof:

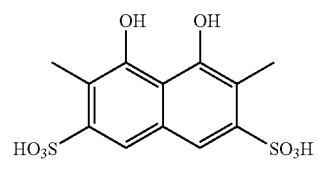

Formula (5)

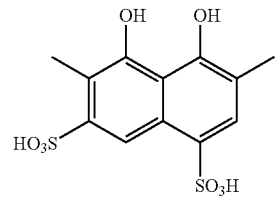

Formula (6)

When D is a metallised 1,8-dihydroxynaphthylene group (i.e. a metal complex) the metal is preferably boron or a transition metal, more preferably Mn, Fe, Cr, Co, Ni, Cu or Zn, especially Co, Ni or Cu. The metal may be complexed with the compound of Formula (1) or a salt thereof in a ratio of from 1:2 to 2:1, preferably in a ratio of metal to compound or salt of 1:2, 2:3, 1:1, 2:2 or 2:1, especially 2:1. However, we have found that when D is not metallised the compound of Formula (1) or salt thereof is still a valuable colorant for ink jet printing. Such unmetallised compounds are cheaper and easier to make than the corresponding metallised compounds and they are more environmentally friendly due to the absence of, for example, transition metals.

Accordingly, D is preferably optionally substituted 1,8-dihydroxynaphthylene which is unmetallised.

Preferably, B is or comprises one or more optionally substituted arylene groups, more preferably one or two optionally substituted phenylene or naphthylene groups and still more preferably one optionally substituted phenylene or naphthylene group. Most preferably, B is an optionally substituted phenylene or naphthylene group (especially an optionally substituted phenylene group).

When B is or comprises more than one arylene group, said arylene groups are optionally connected by means of a covalent bond or group containing from 1 to 10 atoms selected from O, S, N, C, H and combinations thereof, for example —O—, —NR²—, —N=N—, —NR²—CO—, —NR²CONR²—, —S—, —SO—, —SO₂—, —SO₂NR²— or —CR²=CR²—, wherein each R² independently is H or $C_{1-4}$ alkyl.

In embodiments, groups represented by B are of Formula (7):

-L¹(-G-L²)ₓ-   Formula (7)

wherein:
L¹ is a single covalent bond or an optionally substituted phenylene or naphthylene group;
L² is an optionally substituted phenylene or naphthylene group;
G is —O—, —NR²—, —N=N—, —NR²—CO—, —NR²CONR²—, —S—, —SO—, —SO₂—, —SO₂NR²— or —CR²=CR²—, wherein each R² independently is H or $C_{1-4}$ alkyl; and
x is 0, 1 or 2.

In one embodiment of the invention, B carries at least one substituent of the formula —O—$(CH_2)_{1-4}$—OH.

In another embodiment of the invention B is free from substituents of the formula —O—$(CH_2)_{1-4}$—OH.

In a preferred embodiment of the invention B carries at least one sulpho group, especially one sulpho group.

As examples of optionally substituted phenylene and naphthylene groups represented by B there may be mentioned 2-sulphophenylene and 2,5-di(2-hydroxyethyloxy)phenylene.

A′ is an optionally substituted pyrazolyl group which does not have an aromatic group as a substituent directly attached to either of the nitrogen atoms of the pyrazolyl ring (i.e. the pyrazolyl ring of the pyrazolyl group). The term aromatic group in this context means any optionally substituted aromatic or heteroaromatic group. For the avoidance of doubt, by an aromatic group not being directly attached to either of the nitrogen atoms of the pyrazolyl ring it is meant that an aromatic group is not directly attached to any of the nitrogen atoms which form the five membered pyrazolyl ring. The term directly attached means attached via a covalent bond and not via any intermediate linking groups. It has been found that when A′ does not have an aromatic group as a substituent directly attached to either of the nitrogen atoms of the pyrazolyl ring one or more of the performance requirements for IJP may be improved in comparison to similar compounds in which the pyrazolyl group does have an aromatic group as a substituent on either of the nitrogen atoms of the pyrazolyl ring as disclosed, for example, in WO 03/106572.

A′ is preferably a pyrazolyl group of Formula (8a), (8b) or (8c), especially (8a):

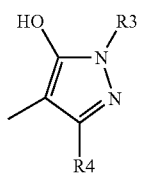

Formula (8a)

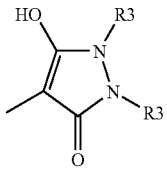

Formula (8b)

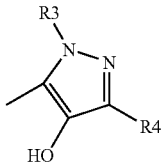

Formula (8c)

wherein
R³, or each R³ independently where there are two R³ groups present, is H, optionally substituted alkyl (especially optionally substituted $C_{1-4}$ alkyl), cyano, —COOR¹, —CONR¹R² or —COR¹, wherein R¹ and R² are as defined above; and
R⁴ is H, optionally substituted alkyl (especially optionally substituted $C_{1-4}$ alkyl), optionally substituted alkoxy (especially optionally substituted $C_{1-4}$ alkoxy), optionally substituted aryl (especially optionally substituted phenyl or naphthyl), optionally substituted heteroaryl, optionally substituted aryloxy, optionally substituted amino, halogen, cyano, hydroxyl, nitro, sulpho, phosphato, —COOR¹, —OCOOR¹, —OCOR¹, —COR¹, —CONR¹R², —OCONR¹R², —SR¹, —SO₂NR¹R², or —SO₂R¹, wherein R¹ and R² are as defined above.

As described above, R³, which represents a substituent on the nitrogen atoms of the pyrazolyl group, is not an aromatic group.

Preferably, R³, or each R³ independently where there are two R³ groups present, is H or optionally substituted $C_{1-4}$ alkyl (more preferably optionally substituted methyl, ethyl or tert-butyl).

Preferably, R⁴ is H, optionally substituted $C_{1-4}$ alkyl (more preferably optionally substituted methyl, ethyl or tert-butyl), COOH or CONH₂.

Preferred optional substituents for R³ and R⁴ are sulpho, carboxy, phosphato, $C_{1-4}$ alkyl, $C_{1-4}$ alkoxy, amino, halo and hydroxy groups.

In view of the foregoing description of the present invention, in preferred embodiments, in Formula (1):

A is optionally substituted phenyl, naphthyl, pyridyl or pyrazolyl;

D is of Formula (3) or a metal complex thereof:

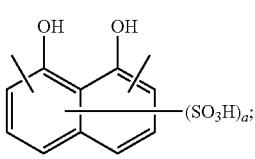

Formula (3)

a is 1 or 2;

B is of Formula (7):

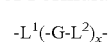

Formula (7)

wherein:
L¹ is a single covalent bond or an optionally substituted phenylene or naphthylene group;
L² is an optionally substituted phenylene or naphthylene group;
G is —O—, —NR²—, —N=N—, —NR²—CO—, —NR²CONR²—, —S—, —SO—, —SO₂—, —SO₂NR²— or —CR²=CR²—, wherein each R² independently is H or $C_{1-4}$ alkyl; and
x is 0, 1 or 2; and A' is a pyrazolyl group of Formula (8a), (8b) or (8c):

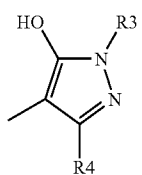

Formula (8a)

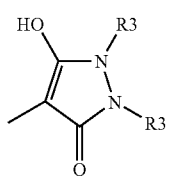

Formula (8b)

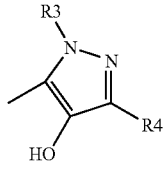

Formula (8c)

wherein
R³, or each R³ independently where there are two R³ groups present, is H, optionally substituted alkyl (especially optionally substituted $C_{1-4}$ alkyl), cyano, —COOR¹ or —COR¹, wherein R¹ is as defined above; and R⁴ is H, optionally substituted alkyl (especially optionally substituted $C_{1-4}$ alkyl), optionally substituted alkoxy (especially optionally substituted $C_{1-4}$ alkoxy), optionally substituted aryl (especially optionally substituted phenyl or naphthyl), optionally substituted heteroaryl, optionally substituted aryloxy, optionally substituted amino, halogen, cyano, hydroxyl, nitro, sulpho, phosphato, —COOR¹, —OCOOR¹, —OCOR¹, —COR¹, —CONR¹R², —OCONR¹R², —SR¹, —SO₂NR¹R², or —SO₂R¹, wherein R¹ and R² are as defined above.

In still more preferred embodiments, in Formula (1):
A is optionally substituted phenyl or naphthyl (especially phenyl);
D is of Formula (4) or a metal complex thereof:

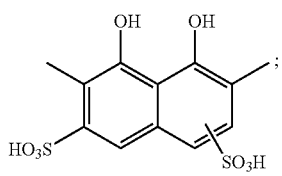

Formula (4)

B is optionally substituted phenylene or naphthylene group (especially phenylene); and
A' is a pyrazolyl group of Formula (8a):

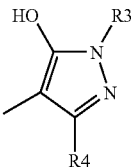

Formula (8a)

wherein:
R³ is H or optionally substituted $C_{1-4}$ alkyl (more preferably optionally substituted methyl, ethyl or tert-butyl); and
R⁴ is H, optionally substituted $C_{1-4}$ alkyl (more preferably optionally substituted methyl, ethyl or tert-butyl), COOH or CONH₂.

In a preferred embodiment of the invention, the compound of Formula (1) or salt thereof is of Formula (9) or a salt thereof:

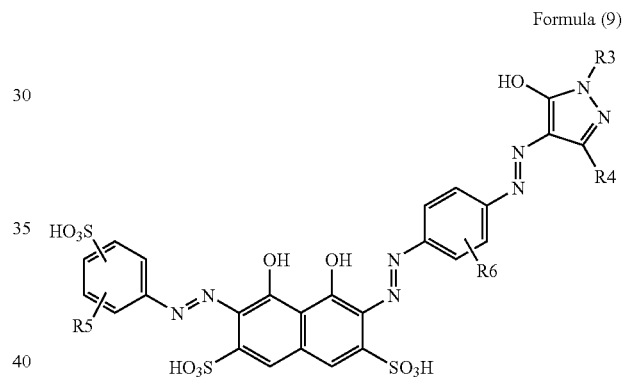

Formula (9)

wherein:
R³ is H or optionally substituted $C_{1-4}$ alkyl (more preferably optionally substituted methyl, ethyl or tert-butyl);
R⁴ is H, optionally substituted $C_{1-4}$ alkyl (more preferably optionally substituted methyl, ethyl or tert-butyl), COOH or CONH₂; and
R⁵ and R⁶ independently are selected from H, optionally substituted alkyl (especially optionally substituted $C_{1-4}$ alkyl), optionally substituted alkoxy (especially optionally substituted $C_{1-4}$ alkoxy), optionally substituted aryl (especially optionally substituted phenyl or naphthyl), optionally substituted heteroaryl, optionally substituted aryloxy, optionally substituted amino, halogen, cyano, hydroxyl, nitro, sulpho, phosphato, arylazo, —COOR¹, —OCOOR¹, —OCOR¹, —COR¹, —CONR¹R², —OCONR¹R², —SR¹, —SO₂NR¹R², and —SO₂R¹ where R¹ and R² are as defined above.

Preferably, R⁵ and R⁶ independently are selected from nitro, sulpho, carboxy, optionally substituted amino, optionally substituted $C_{1-4}$ alkyl, optionally substituted $C_{1-4}$ alkoxy and hydroxy.
More preferably, R⁵ is nitro.
More preferably, R⁶ is sulpho.

In a more preferred embodiment of the invention, the compound of Formula (1) or salt thereof is of Formula (10) or a salt thereof:

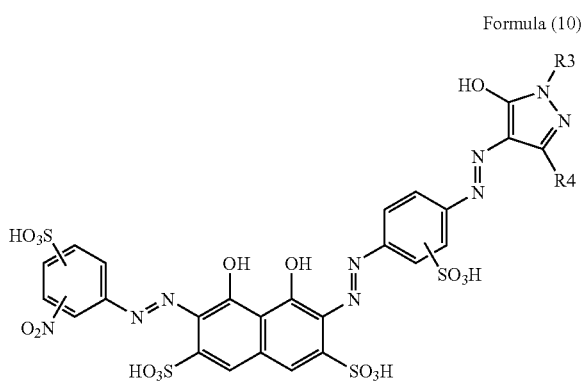

Formula (10)

wherein $R^3$ is H or optionally substituted $C_{1-4}$ alkyl (more preferably optionally substituted methyl, ethyl or tert-butyl); and $R^4$ is H, optionally substituted $C_{1-4}$ alkyl (more preferably optionally substituted methyl, ethyl or tert-butyl), COOH or $CONH_2$.

Preferably, the compound of Formula (1) or salt thereof is suitable for use as a colorant in an ink composition, preferably a black ink composition.

In this specification, where any substituent is itself defined as being optionally substituted it may be substituted by one or more of any of the substituents described herein.

In this specification, unless the context indicates otherwise, preferred aryl groups are phenyl and naphthyl and preferred heteroaryl groups are pyridyl, pyrazolyl and 1,2,4-triazole.

The term 'halogen' or 'halo' as used herein signifies fluoro, chloro, bromo and iodo. In this specification, unless the context indicates otherwise, preferred halogen or halo groups are fluoro, chloro and bromo.

Unless the context clearly indicates otherwise, a group herein which comprises a chain of three or more atoms signifies a group in which the chain wholly or in part may be linear, branched and/or form a ring (including spiro and/or fused rings).

The compound of Formula (1) preferably is provided in a salt form. Preferred salts are alkali metal salts, especially lithium, sodium and potassium salts, ammonium and substituted ammonium salts and mixed salts thereof (i.e. of at least two of these). Especially preferred salts are selected from ammonium, substituted ammonium, lithium and sodium salts and mixed salts thereof (i.e. of at least two of these). The compound may be converted into a salt using known techniques.

Any groups shown herein in a free acid form, for example, may be provided in a salt form. For instance, $SO_3H$ groups may be provided in salt form, e.g. $SO_3Li$, $SO_3Na$ etc., and similarly for carboxy (COOH), phosphate ($PO_3H$) and any other groups that are capable of forming salts.

The compound of formula (1) or salt thereof may exist in tautomeric forms (tautomers) other than those shown in this specification and, accordingly, the Formulae herein include all possible tautomeric forms of the compound or salt. Thus, all other tautomeric forms are included within the scope of the present invention and the claims of this patent specification.

For the avoidance of doubt, the Formulae herein, including in the claims, encompass the compounds and salts in all possible isotopic, isomeric and/or enantiomeric forms and conformations.

Compounds of Formula (1) and salts thereof are preferably free from fibre reactive groups because such groups tend to reduce the long-term storage stability of inks for IJP. The term fibre reactive group is well understood in the art and is used for example in EP 0356014 A1. Fibre reactive groups are capable, under suitable conditions, of reacting with the hydroxy groups present in cellulosic fibres or with the amino groups present in natural fibres to form a covalent linkage between the fibre and the compound.

The present compounds (and salts) and compositions derived therefrom provide prints of attractive, neutral black shades that are particularly well suited for the ink jet printing of text and images. The compositions have good storage stability and low tendency to block the very fine nozzles used in ink jet printers. Furthermore, compounds of Formula (1) may be used to provide printed images having good optical density, good fastness properties (e.g. light-fastness and wet-fastness) and/or resistance to fading in the presence of oxidising air pollutants (e.g. ozone).

In a further aspect of the invention we have also devised a process for the preparation of a compound of Formula (1) or salt thereof, as hereinbefore defined, which comprises diazotising an amine (preferably of formula $A'-NH_2$) and coupling the resultant diazonium salt with a compound of formula A-N=N-D-N=N—BH, wherein A, D and B are as hereinbefore defined to give a compound of Formula (1). The compound of formula A-N=N-D-N=N—BH is formed by diazotising an amine of formula B—$NH_2$ to give a diazonium salt, and coupling the resultant diazonium salt with a compound of formula A-N=N-DH to give a compound of formula A-N=N-D-N=N—BH. Preferably the diazotisations are carried out using a diazotising agent, especially sodium nitrite. Further preferably the diazotisations are carried out at a temperature of 0 to 25° C., more preferably at 0 to 20° C., further preferably at 0 to 10° C.

Surprisingly we have found that the coupling can be performed under conditions of moderate, i.e. relatively neutral, pH facilitated by the use of substantial amounts of aprotic solvents. Aprotic solvents which may be used may be chosen from, for example, dimethylformamide, dimethylsulphoxide, N-methylpyrrolidone, 2-pyrrolidone, ethers, acetone, glymes such as polyglyme (MW 300) or polyethylene glycols and/or mixtures thereof. Particularly preferred aprotic solvents are tetrahydrofuran, N-methylpyrrolidone and polyglyme. The aprotic solvent is preferably present in the range 0 to 80 wt %, preferably 20 to 60 wt %, especially 25 to 45 wt % relative to the total solvent amount used. Use of substantial amounts of aprotic solvents has the advantage of permitting diazo coupling at much lower pH than customary (usually pH in the region of 14), thereby significantly improving the efficiency, from 30% to as much as 70%, of the process as a result of greatly reduced decomposition of diazonium salts.

Preferably the process of the further aspect of the present invention is performed in the presence of an acid binding agent to maintain a moderate pH. Preferably, the acid binding agent used is any which maintains the pH between 5 and 9, preferably between 6 and 7.5. Further, the acid binding agent is preferably selected from but is not limited to alkali metal hydroxides, carbonates, bicarbonates or phosphates or organic bases such as triethanolamine or triethylamine. Particularly preferred alkali metal hydroxide acid-binding agents are NaOH, KOH and LiOH, especially NaOH and LiOH. Particularly preferred, alkali metal carbonate acid-binding agents are $Li_2CO_3$ and $Na_2CO_3$, especially $Na_2CO_3$. This has the advantage of maintaining pH sufficiently low to reduce the decomposition of diazonium salts significantly.

Another process for the preparation of a compound of Formula (1) or salt thereof, as hereinbefore defined, is provided by the present invention which comprises the reaction of a compound of formula A—N=N—X—N=N—B—N=N-A' (wherein A, B and A' are as hereinbefore defined and X is an optionally substituted 1-hydroxy-8-amino-naphthylene group) with a strong base thereby forming a compound of Formula (1) optionally followed by contacting the compound so formed with a metal salt. Preferably, the strong base is a metal hydroxide, more preferably an alkali metal hydroxide, especially sodium or potassium hydroxide. The reaction with strong base preferably comprises heating in solution at an elevated temperature until reaction is complete. Preferred elevated temperatures are 60 to 90° C., more preferably 65 to 80° C., especially 65 to 75° C. The pH is preferably alkaline, more preferably 10 to 14, especially 12 to 14.

The compound of formula A—N=N—X—N=N—B—N=N-A' may be formed by diazotising an amine of formula A'-$NH_2$ and coupling the resultant diazonium salt with a compound of formula A—N=N—X—N=N—BH.

The latter process of the present invention has the unexpected advantages of using common and cheaply available starting materials based on 1-amino-8-hydroxynaphthylene disulphonic acid. In a further optional step, the process optionally further comprises the complexation of a compound of Formula (1) or a salt thereof with a metal, preferably a transition metal.

All references in the processes to compounds include references to corresponding salts thereof.

In still another aspect, the present invention provides a composition, which may be used in the printing process of the invention, wherein the composition comprises:

(a) from 0.01 to 30 parts of a compound of Formula (1) or salt thereof; and (b) from 70 to 99.99 parts of a liquid medium or a low melting point solid medium;

wherein all parts are by weight and the number of parts of (a)+(b)=100.

The composition is preferably an ink composition and more preferably an ink composition for use as an ink jet printing ink.

The number of parts of component (a) is preferably from 0.1 to 20, more preferably from 0.5 to 15, further preferably from 1 to 10 and especially from 1 to 5 parts. The number of parts of component (b) is preferably from 99.9 to 80, more preferably from 99.5 to 85, further preferably from 99 to 90 and especially from 99 to 95 parts.

When the medium is a liquid, preferably component (a) is completely dissolved in component (b). Preferably component (a) has a solubility in component (b) at 20° C. of at least 10%. This allows the preparation of liquid dye concentrates which may be used to prepare inks and reduces the chance of the dye precipitating if evaporation of the liquid medium occurs during storage.

Preferred liquid media include water or a mixture of water and an organic solvent. Alternatively, the liquid medium may comprise an organic solvent and be substantially free from water. Compositions comprising such liquid media may be suitable as ink compositions and more preferably as ink compositions for use as an ink jet printing ink.

When the liquid medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible (water soluble) organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$ alkyl ethers of diols, preferably mono-$C_{1-4}$ alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$ alkyl and $C_{1-4}$ alkyl ethers of diols, more preferably mono-$C_{1-4}$ alkyl ethers of diols having 2 to 12 carbon atoms, especially ((2-methoxy-2)-ethoxy)-2-ethoxyethanol.

A preferred liquid medium comprises:

(a) from 75 to 95 parts water; and (b) from 25 to 5 parts in total of one or more solvents selected from diethylene glycol, 2-pyrrolidone, thiodiglycol, N-methylpyrrolidone, cyclohexanol, caprolactone, caprolactam and pentane-1,5-diol;

wherein the parts are by weight and the sum of the parts (a) and (b)=100.

Another preferred liquid medium comprises:

(a) from 60 to 80 parts water;

(b) from 2 to 20 parts diethylene glycol; and (c) from 0.5 to 20 parts in total of one or more solvents selected from 2-pyrrolidone, N-methylpyrrolidone, cyclohexanol, caprolactone, caprolactam, pentane-1,5-diol and thiodiglycol;

wherein the parts are by weight and the sum of the parts (a), (b) and (c)=100.

Examples of further suitable liquid media comprising a mixture of water and one or more organic solvents are described in U.S. Pat. No. 4,963,189, U.S. Pat. No. 4,703,113, U.S. Pat. No. 4,626,284 and EP 425150A.

When the liquid medium comprises an organic solvent substantially free from water, (i.e. less than 1% water by weight) the solvent preferably has a boiling point of from 300 to 200° C., more preferably of from 40 to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the compound in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) and/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink composition.

Liquid media comprising an organic solvent free from water are particularly useful where fast drying times are required and particularly when printing onto hydrophobic and non-absorbent substrates, for example plastics, metal and glass.

In one embodiment, the liquid medium comprises an oxidant. We have found that the presence of an oxidant in the liquid medium may further improve the stability of the composition. Preferred oxidants include $KlO_3$, $KlO_4$, $K_2S_2O_8$, 1,4-benzoquinone, tetrachloro benzoquinone and mixtures thereof.

Preferred low melting solid media have a melting point in the range from 60° C. to 125° C. Suitable low melting point solids include long chain fatty acids or alcohols, preferably those with $C_{18-24}$ chains, and sulphonamides. The compound of Formula (1) or salt thereof may be dissolved in the low melting point solid or may be finely dispersed in it.

In one preferred embodiment, the pH of the composition is from 4 to 11, more preferably from 7 to 10.

The desired pH may be obtained by the addition of a pH-adjusting agent such as an acid, base or pH buffer. The amount of pH adjusting agent used will vary according to the desired pH of the ink and is preferably present in an amount of up to 10% by wt of the total composition, more preferably from 0.1 to 6% by wt of the total composition.

Preferred pH adjusting agents are pH buffers which, in embodiments, are more preferably pH buffers which maintain a pH of 4 to 8. In one preferred embodiment, the composition comprises a pH buffer and has a pH of 4 to 8. Especially preferred are pH buffers selected from the group comprising TRIS (tris(hydroxymethyl)aminomethane), cationic primary aliphatic amines, zwitterionic amino acids (these last two categories being known to those in the art as "Good's buffers" described by N. E. Good et. al. in Biochemistry, 1966, 5(2) 467-477, herein incorporated by reference), phosphate buffers, amino-hydroxyalkylsulfonic acid zwitterions (such as those described in U.S. Pat. No. 4,169,950 herein incorporated by reference) and trishydroxymethylaminomethane derivatives. Examples of suitable pH buffers include 1,3-bis[tris(hydroxymethyl)methylamino]propane, N-tris(hydroxymethyl)methyl-2-aminoethane-sulfonic acid, 2-(N-morpholino)ethanesulfonic acid, N-(2-hydroxyethyl)piperazine-N'-(2-ethanesulfonic acid), 4-(N-morpholino)butanesulfonic acid, 3-[N,N-bis(2-hydroxyethyl)-amino]-2-hydroxypropanesulfonic acid, tris(hydroxymethyl)aminomethane, N-(2-acetamido)-2-iminodiacetic acid, N-tris(hydroxymethyl)methylglycine, N-(2-hydroxy-ethyl)piperazine-N'-(2-hydroxypropanesulfonic acid, N,N-diethylanthranilic acid and $NaH_2PO_4$.

The viscosity of the composition at 25° C. is preferably less than 50 cP, more preferably less than 20 cP and especially less than 5 cP.

When the compositions according to the invention are used as ink jet printing compositions, the composition preferably has a concentration of less than 500 parts per million, more preferably less than 100 parts per million of halide ions. It is especially preferred that the composition has less than 100, more preferably less than 50 parts per million of divalent and trivalent metals, wherein parts refer to parts by weight relative to the total weight of the composition. We have found that purifying the compositions to reduce the concentration of these undesirable ions reduces nozzle blockage in ink jet printing heads, particularly in thermal ink jet printers. Similarly low levels as divalent and trivalent metals are also preferred.

Preferably, compositions of the present invention suitable for use as ink compositions in an ink-jet printer have been filtered through a filter having a mean pore size below 10 μm, more preferably below 3 μm, especially below 2 μm, more especially below 1 μm. This filtration removes particulate matter that could otherwise block the fine nozzles found in many ink-jet printers.

The compounds or salts of the invention may be used as the sole colorant in inks because of their attractive black shade. However, if desired, one may combine the present compounds or salts with one or more further colorants if a slightly different shade is required for a particular end use. The further colorants are preferably dyes. When further colorants are included in the composition these are preferably selected from black, magenta, cyan, yellow, red, green, blue and orange colorants and combinations thereof. Suitable black, magenta, cyan, yellow, red, green, blue and orange colorants for this purpose are known in the art. Some examples are given below.

Suitable further black colorants include C.I. Food Black 2, C.I. Direct Black 19, C.I. Reactive Black 31, PRO-JET™ Fast Black 2, C.I. Direct Black 195; C.I. Direct Black 168; other black colorants made or sold by original equipment manufacturers (OEMs) including Lexmark, Seiko Epson, Canon and Hewlett-Packard or by colorant manufacturers including Fuji Photo Film Co., Nippon Kayaku and Mitsubishi and other black colorants described in patents and patent applications by OEMs including the aforesaid Lexmark (e.g. EP 0539178 A2, Example 1, 2, 3, 4 and 5), Orient Chemicals (e.g. EP 0347803 A2, pages 5-6, azo dyes 3, 4, 5, 6, 7, 8, 12, 13, 14, 15 and 16), Canon, Hewlett-Packard and Seiko Epson Corporation or by colorant manufacturers including Fuji Photo Film Co., Nippon Kayaku and Mitsubishi. PRO-JET™ is a trade mark of Fujifilm Imaging Colorants Limited (Manchester, UK).

Suitable further magenta colorants include PRO-JET™ Fast Magenta 2 and other magenta colorants made by, sold by or described in patents and patent applications by OEMs including Lexmark, Seiko Epson, Canon and Hewlett-Packard or colorant manufacturers including Fuji Photo Film Co., Nippon Kayaku and Mitsubishi.

Suitable further yellow colorants include C.I. Direct Yellow 142; C.I. Direct Yellow 132; C.I. Direct Yellow 86; PRO-JET™ Yellow OAM; PRO-JET™ Fast Yellow 2; C.I. Direct Yellow 85; C.I. Direct Yellow 173; and C.I. Acid Yellow 23 and other yellow colorants made by, sold by or described in patents and patent applications by OEMs including Lexmark, Seiko Epson, Canon and Hewlett-Packard or colorant manufacturers including Fuji Photo Film Co., Nippon Kayaku and Mitsubishi.

Suitable further cyan colorants include phthalocyanine colorants, C.I. Direct Blue 199 and C.I. Acid Blue 9 and other cyan colorants made by, sold by or described in patents and patent applications by OEMs including Lexmark, Seiko Epson, Canon and Hewlett-Packard or colorant manufacturers including Fuji Photo Film Co., Nippon Kayaku and Mitsubishi.

The compositions of the present invention may contain, for example, the additional dye or dyes as described in US 2005/126435 A.

The compositions of the present invention may also contain additional components known for use in ink jet printing inks, for example viscosity and surface tension modifiers, corrosion inhibitors, biocides, kogation reducing additives and surfactants which may be ionic or non-ionic.

Typically the liquid medium will further comprise one or more surfactants, for example anionic and/or nonionic surfactants. Examples of anionic surfactants include: sulphonate surfactants such as sulphosuccinates (Aerosol™ OT, A196; AY and GP, available from CYTEC) and sulphonates (Aero-Sol™ DPOS-45, OS available from CYTEC; Witconate™ C-50H available from WITCO; Dowfax™ 8390 available from DOW); and fluoro surfactants (Fluorad™ FC99C available from 3M). Examples of nonionic surfactants include: fluoro surfactants (Fluorad™ FC170C available from 3M); alkoxylate surfactants (Tergitol™ series 15S-5, 15S-7, and 15S-9 available from Union Carbide); and organosilicone surfactants (Silwet™ L-77 and L-76-9 available from WITCO). The Surfynol™ range of surfactants (available from Air Products) may also be suitable.

One or more of the biocides commonly employed in ink jet inks may optionally be used in the ink, such as Nuosept™ 95, available from Huls America (Piscataway, N.J.); Proxel™ GXL, available from Arch Chemicals, Inc. (Norwalk, Conn.); and glutaraldehyde, available from Union Carbide Company (Bound Brook, N.J.) under the trade designation Ucarcide 250.

Inks according to the invention may optionally also include one or more metal chelators. Such chelators are used to bind any free transition metal cations that may be present in the ink. Examples of preferred metal chelators include: ethylenediaminetetraacetic acid ("EDTA"), diethylenediaminepentaacetic acid ("DPTA"), trans-1,2-diaminocyclohexanetetraacetic acid ("CDTA"), ethylenedinitrilotetraacetic acid ("EGTA"). Other chelators may be employed additionally or alternatively.

In particular embodiments, the ink compositions of the present invention may comprise an organic acid and an organic base as described in US 2005/076806A.

In further embodiments, in the ink compositions of the present invention the compound or salt of the present invention may be present as part of an inclusion compound as described, for instance, in JP 2005-239822 A. For example, a compound such as cyclodextrin may be the host and the compound or salt of the present invention may be the guest of the inclusion compound.

Yet another aspect of the present invention provides a substrate (preferably a paper, an overhead projector slide or a textile material) printed with a composition, a compound or salt thereof or by means of a process according to the present invention.

Still yet another aspect of the present invention provides an ink jet printer cartridge, optionally refillable, comprising one or more chambers and a composition, wherein the composition is present in at least one of the chambers and the composition is a composition according to the present invention.

In an additional aspect of the present invention, an ink set is provided, which comprises at least a black ink, a magenta ink, a cyan ink and a yellow ink, wherein the black ink comprises a compound or salt thereof according to the present invention and/or a composition according to the present invention.

Dyes comprised in a magenta ink in such an ink set may include PRO-JET™ Fast Magenta 2 and/or Acid Red 52. Dyes comprised in a cyan ink in such an ink set may include C.I. Direct Blue 199, Direct Blue 68 and/or Direct Blue 87. Dyes comprised in a yellow ink in such an ink set may include C.I. Direct Yellow 86, Direct Yellow 132 and/or Direct Yellow 173. Optionally, the black ink further contains one or more black dyes, e.g. PRO-JET™ Fast Black 2 and/or any of the dyes described in EP 0539178 A2 or EP 0347803.

In this specification, unless the context clearly indicates otherwise, as used herein plural forms of the terms herein are to be construed as including the singular form and vice versa.

Throughout the description and claims of this specification, unless the context clearly indicates otherwise, the words "comprise" and "contain" and variations of the words, for example "comprising" and "comprises", mean "including but not limited to", and are not intended to (and do not) exclude other components.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

The invention is further illustrated by the following Examples in which all parts and percentages are by weight unless specified otherwise. The Examples are only illustrative of the invention and are not limiting on the scope of the invention.

EXAMPLE 1

(i) Pyrazole Compound Synthesis

Preparation of Compound:

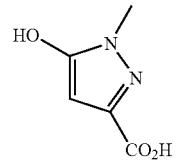

(3-carboxy-5-hydroxy-1-methylpyrazole)

Ester Formation

Concentrated sulphuric acid (13.5 g:013 mol) was added dropwise over 5 min to stirred methylated spirits 74OP (100 ml) and then cooled to <30° C. Methyl hydrazine (11.51 g; 0.25 mol) was added dropwise over 10 min at <60° C. and the mixture then cooled to 25° C., followed by the addition diethyl oxalacetate sodium salt (60.84 g; 0.275 mol). After stirring for 2 hours the temperature was raised to reflux and maintained for 3 hours, cooled and then filtered. The filtrates evaporated and the resulting residue stirred with water. The product was filtered and washed with water before being recrystallised from water to give an off white solid (22.84 g:53%: mass spectrum (M-H)-ve 169)

Ester Hydrolysis

The resulting above ester (20.00 g:0.11 mol) was stirred in water (100 ml) adjusted to approx pH13 by the addition of sodium hydroxide pellets. After stirring for a total of 5 hours at room temperature the pH was adjusted to pH 1 by the addition of 2N hydrochloric acid and the precipitate filtered. The resulting solid was stirred with acetone filtered and dried to give an off white solid (9.20 g: 59%; mass spectrum (M-H)-ve 141).

(ii) Preparation of Dye Compound

Preparation of:

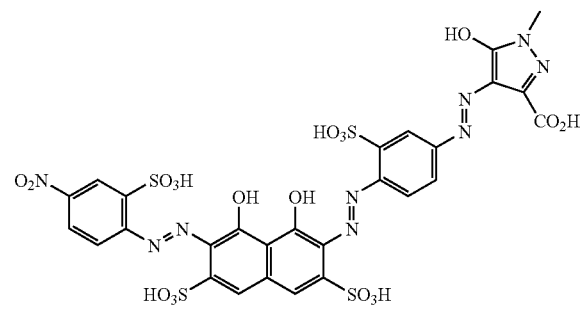

Stage (A)—First Coupling and Stage (B)—Second Coupling

The methodology described in Stages (A) and (B) of Example 2 in WO 03/106572 (page 14) was followed to prepare the intermediate compound (i.e. black solid, $\lambda_{max}$=584 nm):

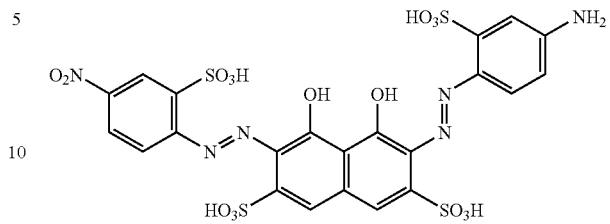

Stage (C)—Third Coupling

A solution of the above solid (0.10 mol) was stirred in water and sodium nitrite (1.68 g; 0.024 mol) added. The solution was then added dropwise over 5 min to stirred ice/water containing concentrated hydrochloric acid (10 ml) at 0 to 10° C. After stirring for 2 hours the excess nitrous acid was destroyed by the addition of sulphamic acid. The resulting diazonium was then added dropwise over 5 min to a stirred a solution of 3-carboxy-5-hydroxy-1-methylpyrazole (1.70 g; 0.012 mol) at 0 to 10° C. and pH 6-8. After stirring overnight, the product was salted out with lithium chloride, filtered and then washed with lithium chloride solution. The damp paste was dissolved in water at pH9, dialysed using Visking™ tubing (<30 μScm$^{-1}$) and then screened through a cascade of filters (GF/F, 0.45 μm nylon). The resulting solution was dried in an oven to give a reddish black solid of the title compound (6.52 g:70%; $\varepsilon_{max}$ 66,679; $\lambda_{max}$(H$_2$O) 579 nm; mass spectrum (M-H)-ve 900).

EXAMPLES 2-22

Analogous methodology to Example 1 was used to prepare the compounds shown in the second column of Table 1. The compound listed in Column C was used in place of 3-carboxy-5-hydroxy-1-methylpyrazole.

TABLE 1

| Ex. No. | Compound Structure | C | λ max (nm) | Band width at half height (nm) | ε max |
|---|---|---|---|---|---|
| 2 | | | 582 | 186 | 58,231 |

TABLE 1-continued
| Ex. No. | Compound Structure | C | λ max (nm) | Band width at half height (nm) | ε max |
|---|---|---|---|---|---|
| 3 | 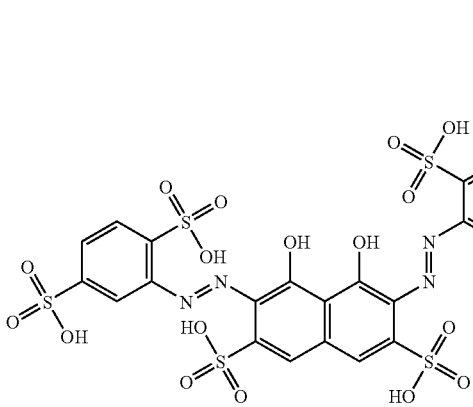 | 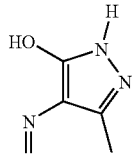 | 585 | 126 | 58,136 |
| 4 | 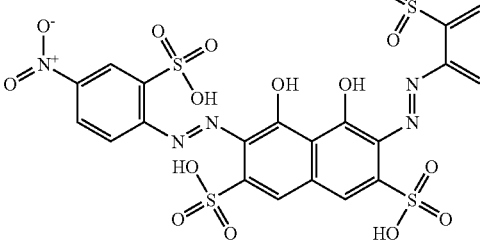 | 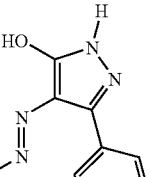 | 574 | 128 | 61,504 |
| 5 | 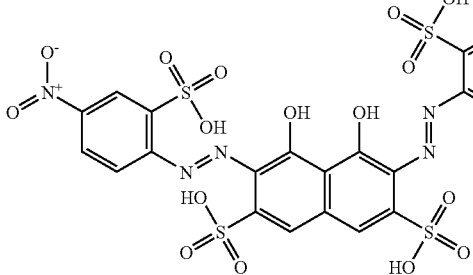 | 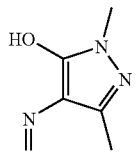 | 572 | 126 | 61,386 |

TABLE 1-continued

| Ex. No. | Compound Structure | C | λ max (nm) | Band width at half height (nm) | ε max |
|---|---|---|---|---|---|
| 6 | | | 582 | 164 | 58,827 |
| 7 | | | 583 | 167 | 53,748 |
| 8 | | | 573 | 123 | 62,289 |

TABLE 1-continued

| Ex. No. | Compound Structure | C | λ max (nm) | Band width at half height (nm) | ε max |
|---|---|---|---|---|---|
| 9 | | | 573 | 123 | 64,439 |
| 10 | | | 579 | 132 | 64,716 |
| 11 | | | 571 | 126 | 59,447 |

TABLE 1-continued
| Ex. No. | Compound Structure | C | λ max (nm) | Band width at half height (nm) | ε max |
|---|---|---|---|---|---|
| 12 | 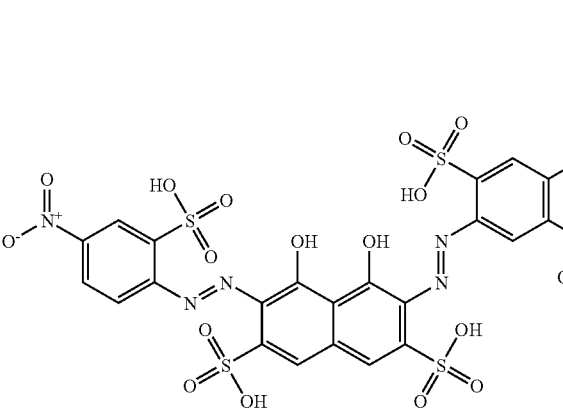 | 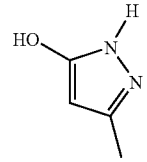 | 569 | 121 | 61,180 |
| 13 | 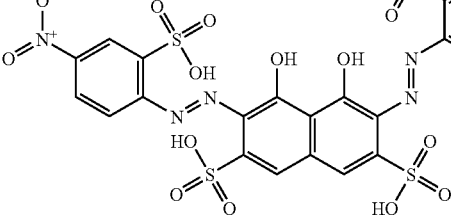 | 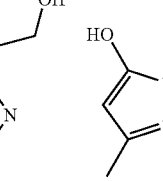 | 572 | 126 | 68,241 |
| 14 | 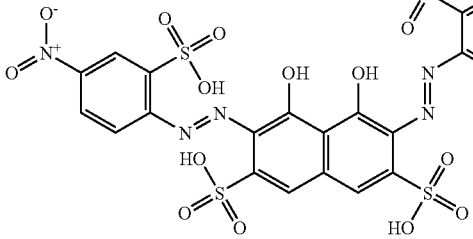 | 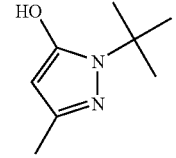 | 573 | 125 | 64,495 |

TABLE 1-continued
| Ex. No. | Compound Structure | C | λ max (nm) | Band width at half height (nm) | ε max |
|---|---|---|---|---|---|
| 15 | 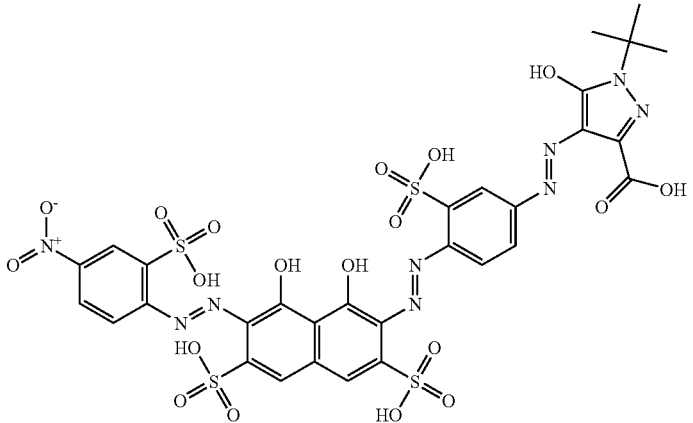 | 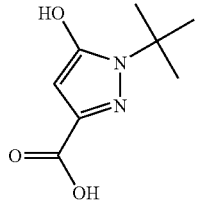 | 583 | 140 | 67,792 |
| 16 | 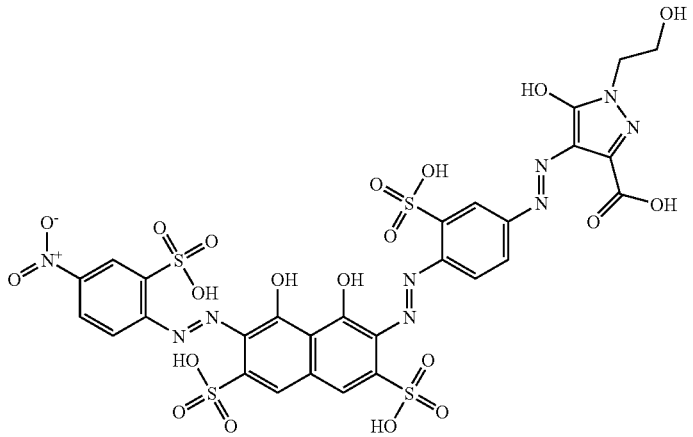 | 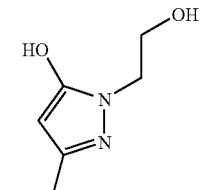 | 581 | 135 | 66,893 |
| 17 | 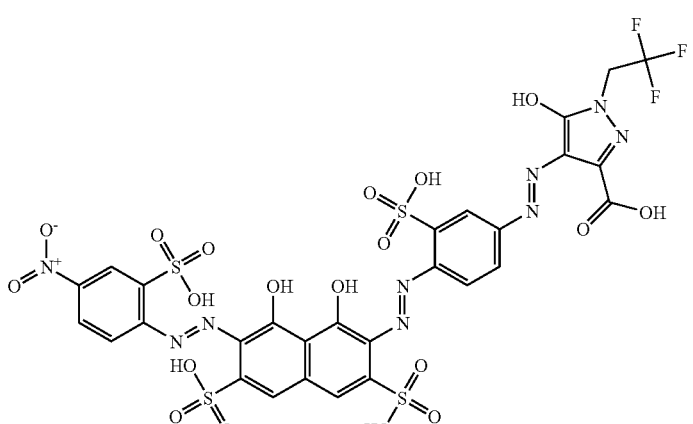 | 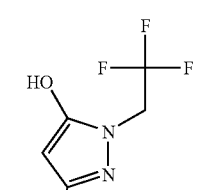 | 579 | 140 | 64,688 |

TABLE 1-continued
| Ex. No. | Compound Structure | C | λ max (nm) | Band width at half height (nm) | ε max |
|---|---|---|---|---|---|
| 18 | 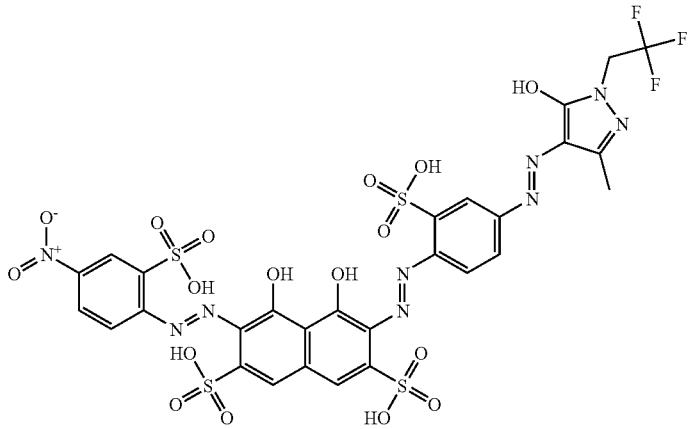 | 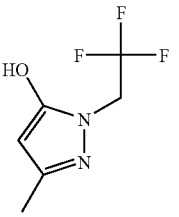 | 571 | 128 | 60,513 |
| 19 | 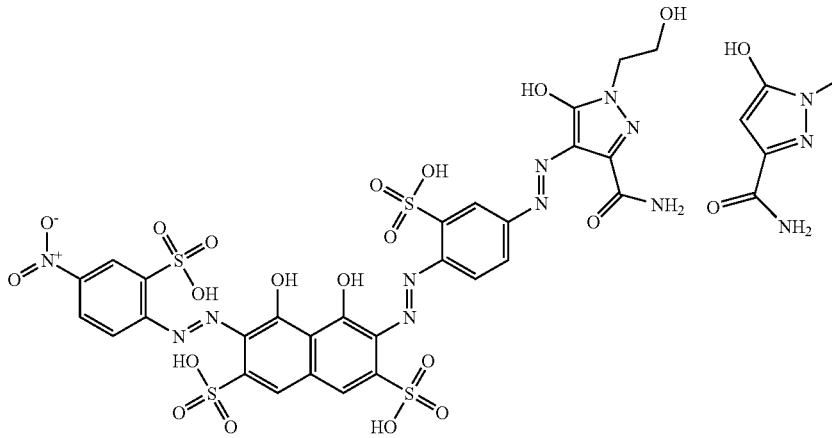 | 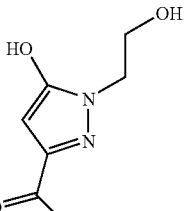 | 585 | 176 | 64,184 |
| 20 | 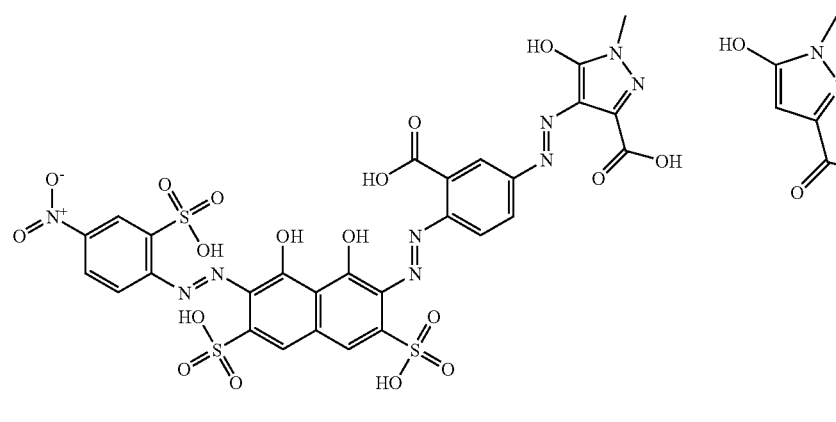 | 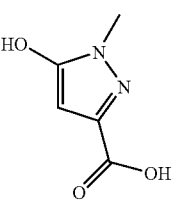 | 606 | 284 | 48,235 |

TABLE 1-continued

| Ex. No. | Compound Structure | C | λ max (nm) | Band width at half height (nm) | ε max |
|---|---|---|---|---|---|
| 21 | | | 607 | 285 | 36,987 |
| 22 | | | 593 | 307 | 41,583 |

EXAMPLE 23

Ink Formulation

Inks may be prepared according to the following formulation wherein Dye is a dye compound (or mixture of two or more dye compounds) from the Examples 1 to 22 above:

| | |
|---|---|
| 2-Pyrrolidone | 5 parts |
| Thiodiglycol | 5 parts |
| Surfynol ™ 465 | 1 part (from Air Products Inc., USA) |
| Dye | 3 parts |
| Water | 86 parts |

EXAMPLE 24

Further Ink Formulations

Further inks described in Tables 2 and 3 may be prepared wherein the Dye described in the first column is the Dye made in the above example of the same number. Numbers quoted in the second column onwards refer to the number of parts of the relevant ingredient and all parts are by weight. The inks may be applied to paper or other substrate as herein described by thermal or piezo ink jet printing.

The following abbreviations are used in Table 2 and 3:
PG=propylene glycol
DEG=diethylene glycol
NMP=N-methyl pyrollidone
DMK=dimethylketone
IPA=isopropanol
MEOH=methanol
2P=2-pyrrolidone
MIBK=methylisobutyl ketone
P12=propane-1,2-diol
BDL=butane-2,3-diol
CET=cetyl ammonium bromide
PHO=$Na_2HPO_4$ and
TBT=tertiary butanol
TDG=thiodiglycol

TABLE 2

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 |  | 6 | 4 |  |  |  |  | 5 |  |
| 2 | 3.0 | 90 |  | 5 | 5 |  | 0.2 |  |  |  |  |  |
| 3 | 10.0 | 85 | 3 |  | 3 | 3 |  |  |  | 5 | 1 |  |
| 4 | 2.1 | 91 |  | 8 |  |  |  |  |  |  |  | 1 |
| 5 | 3.1 | 86 | 5 |  |  |  |  | 0.2 | 4 |  |  | 5 |
| 6 | 1.1 | 81 |  |  | 9 |  | 0.5 | 0.5 |  |  | 9 |  |
| 7 | 2.5 | 60 | 4 | 15 | 3 | 3 |  |  | 6 | 10 | 5 | 4 |
| 8 | 5 | 65 |  | 20 |  |  |  |  | 10 |  |  |  |
| 9 | 2.4 | 75 | 5 | 4 |  | 5 |  |  |  | 6 |  | 5 |
| 10 | 4.1 | 80 | 3 | 5 | 2 | 10 |  | 0.3 |  |  |  |  |
| 11 | 3.2 | 65 |  | 5 | 4 | 6 |  |  | 5 | 4 | 6 | 5 |
| 12 | 5.1 | 96 |  |  |  |  |  |  |  | 4 |  |  |
| 13 | 10.8 | 90 | 5 |  |  |  |  |  | 5 |  |  |  |
| 14 | 10.0 | 80 | 2 | 6 | 2 | 5 |  |  | 1 |  | 4 |  |
| 15 | 1.8 | 80 |  | 5 |  |  |  |  |  |  | 15 |  |
| 16 | 2.6 | 84 |  |  | 11 |  |  |  |  |  | 5 |  |
| 17 | 3.3 | 80 | 2 |  |  | 10 |  |  |  | 2 |  | 6 |
| 18 | 12.0 | 90 |  |  | 7 |  | 0.3 |  | 3 |  |  |  |
| 19 | 5.4 | 69 | 2 | 20 | 2 | 1 |  |  |  |  | 3 | 3 |
| 20 | 6.0 | 91 |  |  | 4 |  |  |  |  |  | 5 |  |

TABLE 3

| Dye | Dye Content | Water | PG | DEG | NMP | CET | TBT | TDG | BDL | PHO | 2P | PI2 |
|---|---|---|---|---|---|---|---|---|---|---|---|---|
| 21 | 3.0 | 80 | 15 |  |  | 0.2 |  |  |  |  | 5 |  |
| 22 | 9.0 | 90 |  | 5 |  |  |  |  |  | 1.2 |  | 5 |
| 1 | 1.5 | 85 | 5 | 5 |  | 0.15 | 5.0 | 0.2 |  |  |  |  |
| 2 | 2.5 | 90 |  | 6 | 4 |  |  |  |  | 0.12 |  |  |
| 3 | 3.1 | 82 | 4 | 8 |  | 0.3 |  |  |  |  |  | 6 |
| 4 | 0.9 | 85 |  | 10 |  |  |  |  | 5 | 0.2 |  |  |
| 5 | 8.0 | 90 |  | 5 | 5 |  |  | 0.3 |  |  |  |  |
| 6 | 4.0 | 70 |  | 10 | 4 |  |  |  | 1 |  | 4 | 11 |
| 7 | 2.2 | 75 | 4 | 10 | 3 |  |  |  | 2 |  | 6 |  |
| 8 | 10.0 | 91 |  |  | 6 |  |  |  |  |  | 3 |  |
| 9 | 9.0 | 76 |  | 9 | 7 |  | 3.0 |  |  | 0.95 | 5 |  |
| 10 | 5.0 | 78 | 5 | 11 |  |  |  |  |  |  | 6 |  |
| 11 | 5.4 | 86 |  |  | 7 |  |  |  |  |  | 7 |  |
| 12 | 2.1 | 70 | 5 | 5 | 5 | 0.1 | 0.2 | 0.1 | 5 | 0.1 | 5 |  |
| 13 | 2.0 | 90 |  |  | 10 |  |  |  |  |  |  |  |
| 14 | 2 | 88 |  |  |  |  |  | 10 |  |  |  |  |
| 15 | 5 | 78 |  |  |  | 5 |  | 12 |  |  | 5 |  |
| 16 | 8 | 70 | 2 |  | 8 |  |  | 15 |  |  | 5 |  |
| 17 | 10 | 80 |  |  |  |  |  | 8 |  | 12 |  |  |
| 18 | 10 | 80 |  |  | 10 |  |  |  |  |  |  |  |

EXAMPLE 25

Buffered Ink Formulations

Inks may be prepared according to the following formulation wherein Dye is a dye compound (or mixture of two or more dye compounds) from the Examples 1 to 22 above

| | |
|---|---|
| 2-Pyrrolidone | 5 parts |
| Propylene glycol | 5 parts |
| Surfynol ™ 465 | 1 part (from Air Products Inc., USA) |
| Dye | 3 parts |
| TRIS | 2 parts |
| Water | 84 parts | pH adjusted to 7.5 by addition of base or acid

Further inks described in Tables 4 and 5 may be prepared wherein the Dye described in the first column is the Dye made in the above examples of the same number. Numbers quoted in the second column onwards refer to the number of parts of the relevant ingredient and all parts are by weight. The pH may be adjusted to the value indicated by addition of base or acid. The inks may be applied to paper or other substrate by ink jet printing, for example, by thermal or piezo ink jet printing.

The following additional abbreviations are used in Table 4 and 5, all other abbreviations are as used in Tables 2 and 3:

BIS-TRIS PROPANE=1,3-bis[tris(hydroxymethyl)methylamino]propane
TES=N-tris(hydroxymethyl)methyl-2-aminoethanesulfonic acid
MES=2-(N-morpholino)ethanesulfonic acid
HEPES=N-(2-hydroxyethyl)piperazine-N'-(2-ethanesulfonic acid)
MOBS=4-(N-morpholino)butanesulfonic acid
DIPSO=3-[N,N-bis(2-hydroxyethyl)amino]-2-hydroxypropanesulfonic acid
TRIS=tris(hydroxymethyl)aminomethane
ADA=N-(2-acetamido)-2-iminodiacetic acid
TRICINE=N-tris(hydroxymethyl)methylglycine
HEPPSO=N-(2-hydroxyethyl)piperazine-N'-(2-hydroxypropanesulfonic acid
DEAS=N,N-diethylanthranilic acid
PHO=$NaH_2PO_4$

TABLE 4

| Dye | Dye Content | Water | PG | DEG | NMP | DMK | Na Stearate | IPA | MEOH | 2P | MIBK | Buffer | Buffer substance | adjusted pH |
|---|---|---|---|---|---|---|---|---|---|---|---|---|---|---|
| 1 | 2.0 | 76 | 5 | | 6 | 4 | | | | 5 | | 2 | PHO | 7.8 |
| 2 | 3.0 | 86.2 | | 5 | 5 | | | | | | | 0.8 | TRIS | 7.2 |
| 3 | 10.0 | 75.5 | | 2 | 3 | 3 | | 5 | | 1 | | 0.5 | BIS-TRIS PROPANE | 6.4 |
| 4 | 2.1 | 88.7 | | 8 | | | | | | | 1 | 0.2 | TES | 7.1 |
| 5 | 3.1 | 77.7 | 5 | | | | 0.2 | 4 | | | 5 | 5 | HEPES | 7.5 |
| 6 | 8.5 | 70.5 | | | 9 | | | | | 9 | | 3 | MOBS | 8.0 |
| 7 | 2.5 | 45.5 | 4 | 15 | 3 | 3 | | 6 | 10 | 5 | 4 | 2 | DIPSO | 7.6 |
| 8 | 6 | 72 | | | 10 | | | 10 | | | | 2 | ADA | 6.5 |
| 9 | 12 | 62.2 | 5 | 4 | | 5 | 0.3 | | 6 | | 5 | 0.5 | TRICINE | 8.0 |

TABLE 5

| Dye | Dye Content | Water | PG | DEG | NMP | CET | TBT | TDG | BDL | 2P | PI2 | Buffer | Buffer substance | adjusted pH |
|---|---|---|---|---|---|---|---|---|---|---|---|---|---|---|
| 10 | 3.0 | 76.5 | 15 | | | 0.2 | | | 1 | 4 | | 0.3 | TRICINE | 7.9 |
| 11 | 9.0 | 80 | | 5 | | | | | | | 5 | 1 | HEPPSO | 7.7 |
| 12 | 1.5 | 81.4 | 5 | 5 | | 0.1 | 5.0 | 0.2 | | | | 1.8 | MES | 5.9 |
| 13 | 0.9 | 88.8 | | 6 | 4 | | | | | | | 0.3 | BIS-TRIS PROPANE | 6.8 |
| 14 | 3.1 | 88 | 4 | 8 | | 0.3 | | | | | 6 | 0.6 | TRIS | 7.8 |
| 15 | 9.5 | 74 | | 10 | | | | | 5 | | | 1.5 | DIPSO | 7.5 |
| 16 | 8.0 | 80.8 | | 5 | 5 | 0.1 | | 0.3 | | | | 0.8 | DEAS | 7.4 |
| 17 | 4.0 | 65 | | 10 | 4 | | | | | 5 | 11 | 1 | TRIS | 8.0 |
| 18 | 2.2 | 68.8 | 4 | 10 | 3 | | 1.0 | | 2 | 6 | | 3 | ADA | 6.5 |

EXAMPLES 26-39

Print Test Examples

Inks were prepared as described in Example 23 and ink-jet printed onto a variety of substrates (papers) using a Canon i965 printer. The CIE colour coordinates of each print (A, B, L, Chroma (C) and hue (H)) were measured using a Gretag Spectrolino Spectrodensitometer™ with 0°/45° measuring geometry with a spectral range of 400-700 nm at 20 nm spectral intervals using illuminant D65 with a 2° (CIE 1931) observer angle and a density operation of status A. No less than 2 measurements were taken diagonally across a solid colour block on the print with a size greater than 10 mm×10 mm.

Dyes from Examples 2, 3, 10, 13 and 19 above were used to prepare inks.

In addition to inks containing the dye compounds of the present invention, for comparative purposes inks were also prepared containing dye compounds not within the scope of the present invention ("Comparative Dyes"). In each of the Comparative Dyes the pyrazolyl group carried an aromatic group attached to a nitrogen atom of the pyrazolyl ring. The Comparative Dyes were as follows:

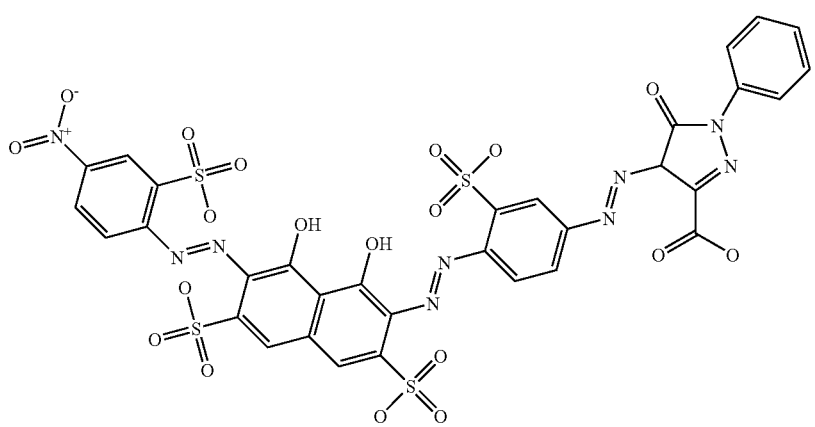

Comparative Dye C1

-continued

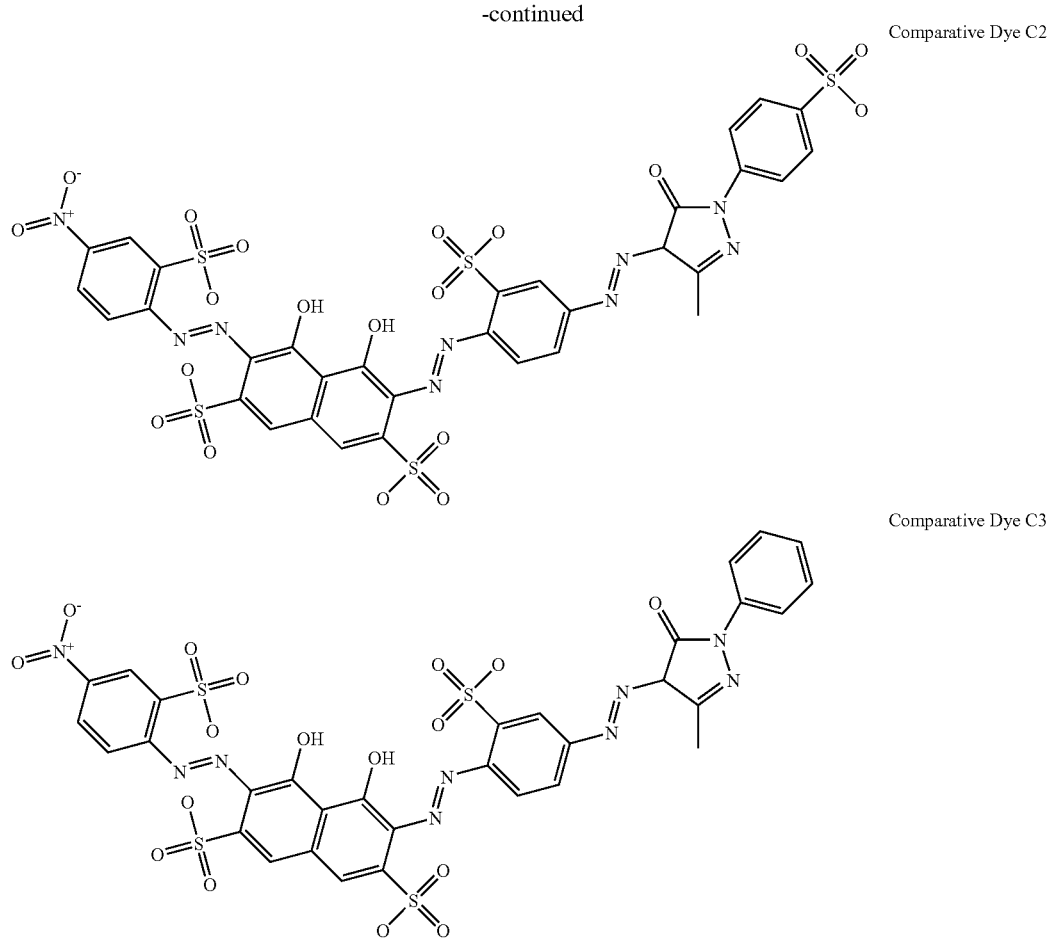

Comparative Dye C2

Comparative Dye C3

Optical Density

The optical density (OD) properties of resultant prints are shown in Table 6 where the example number of the dye compound used to prepare the ink is indicated in the second column. The results demonstrate that inks based on compounds of the present invention display good optical density.

The substrates that were used are referred to in Tables 6, 7 and 8 by the following references numbers:

| Substrate name | Substrate Number |
|---|---|
| HP Advanced PhotoPaper ™, Glossy | 1 |
| Canon PR101 ™ photo paper | 2 |
| Epson Crispia ™ Photo paper | 3 |
| Epson Premium Photo ™ paper | 4 |
| Xerox 4024 ™ paper | 5 |

TABLE 6

| Ex. No. | Dye | SUBSTRATE | Optical Density (OD) |
|---|---|---|---|
| 26 | C2 | 1 | 1.03 |
| 26 | C3 | 1 | 1.57 |
| 26 | 3 | 1 | 1.63 |
| 26 | 19 | 1 | 1.77 |
| 26 | 2 | 1 | 1.78 |
| 26 | 13 | 1 | 1.82 |
| 26 | 10 | 1 | 1.97 |

TABLE 6-continued

| Ex. No. | Dye | SUBSTRATE | Optical Density (OD) |
|---|---|---|---|
| 27 | C3 | 2 | 1.71 |
| 27 | C2 | 2 | 1.75 |
| 27 | 13 | 2 | 1.87 |
| 27 | 2 | 2 | 1.89 |
| 27 | 19 | 2 | 1.93 |
| 27 | 10 | 2 | 2.11 |
| 28 | C2 | 3 | 0.99 |
| 28 | C3 | 3 | 1.42 |
| 28 | 3 | 3 | 1.57 |
| 28 | 19 | 3 | 1.85 |
| 28 | 2 | 3 | 1.86 |
| 28 | 13 | 3 | 1.86 |
| 28 | 10 | 3 | 2.06 |
| 29 | C3 | 4 | 1.47 |
| 29 | C2 | 4 | 1.70 |
| 29 | 2 | 4 | 1.83 |
| 29 | 19 | 4 | 1.84 |
| 29 | 13 | 4 | 1.87 |
| 29 | 10 | 4 | 2.03 |
| 30 | C2 | 5 | 0.80 |
| 30 | C3 | 5 | 0.94 |
| 30 | C1 | 5 | 1.04 |
| 30 | 2 | 5 | 1.06 |
| 30 | 3 | 5 | 1.06 |
| 30 | 19 | 5 | 1.08 |
| 30 | 13 | 5 | 1.12 |
| 30 | 10 | 5 | 1.14 |

Light Fastness

To evaluate light fastness the prints described above were irradiated in an Atlas Ci5000 Weatherometer™ for 100 hours. The results are shown in Table 7 where the example number of the dye used to prepare the ink is indicated in the second column. The degree of fade after exposure to light is expressed as % loss in the optical density (OD). The smaller the % loss in the optical density the higher the light fastness. The results demonstrate that inks based on compounds of the present invention display good light fastness.

TABLE 7

| Ex. No. | Dye | SUBSTRATE | OD LOSS (%) |
|---|---|---|---|
| 31 | 19 | 1 | 38 |
| 31 | 3 | 1 | 32 |
| 31 | 13 | 1 | 50 |
| 31 | 10 | 1 | 60 |
| 31 | C3 | 1 | 73 |
| 32 | 19 | 2 | 66 |
| 32 | 10 | 2 | 71 |
| 32 | C2 | 2 | 84 |
| 33 | 10 | 3 | 38 |
| 33 | 19 | 3 | 39 |
| 33 | 13 | 3 | 50 |
| 33 | C3 | 3 | 57 |
| 34 | 19 | 4 | 37 |
| 34 | 10 | 4 | 37 |
| 34 | 2 | 4 | 50 |
| 34 | 13 | 4 | 52 |
| 34 | C2 | 4 | 54 |
| 34 | C3 | 4 | 57 |

Ozone Fastness

To evaluate ozone fastness, the printed substrates above were assessed using an ozone test cabinet from Hampden Test Equipment. The test was carried out for 48 hours or 96 hours at 40° C. and 50% relative humidity in the presence of 1 part per million of ozone. The degree of fade is expressed as $\Delta E$ where a lower figure indicates higher ozone fastness and $\Delta E$ is defined as the overall change in the CIE colour co-ordinates L, A, B of the print and is expressed by the equation $\Delta E = (\Delta L^2 + \Delta A^2 + \Delta B^2)^{0.5}$. The results are shown in Table 8 where the example number of the dye used to prepare the ink is indicated in the second column. These clearly demonstrate that inks based on compounds of the present invention display good ozone fastness.

TABLE 8

| Ex. No. | Dye | SUBSTRATE | EXPOSURE TIME (HRS) | $\Delta E$ |
|---|---|---|---|---|
| 35 | 19 | 1 | 48 | 7 |
| 35 | 2 | 1 | 48 | 11 |
| 35 | 13 | 1 | 48 | 13 |
| 35 | 10 | 1 | 48 | 15 |
| 35 | 3 | 1 | 48 | 17 |
| 35 | C3 | 1 | 48 | 23 |
| 36 | 3 | 2 | 48 | 30 |
| 36 | 13 | 2 | 48 | 38 |
| 36 | 2 | 2 | 48 | 39 |
| 36 | C2 | 2 | 48 | 40 |
| 37 | 19 | 3 | 96 | 6 |
| 37 | 2 | 3 | 96 | 6 |
| 37 | 10 | 3 | 96 | 7 |
| 37 | 13 | 3 | 96 | 9 |
| 37 | C3 | 3 | 96 | 10 |
| 38 | 19 | 4 | 96 | 5 |
| 38 | 2 | 4 | 96 | 5 |
| 38 | 10 | 4 | 96 | 8 |
| 38 | 13 | 4 | 96 | 9 |
| 38 | C3 | 4 | 96 | 11 |

TABLE 8-continued

| Ex. No. | Dye | SUBSTRATE | EXPOSURE TIME (HRS) | $\Delta E$ |
|---|---|---|---|---|
| 39 | 19 | 1 | 96 | 7 |
| 39 | 2 | 1 | 96 | 13 |
| 39 | 13 | 1 | 96 | 13 |
| 39 | 10 | 1 | 96 | 15 |
| 39 | 3 | 1 | 96 | 18 |
| 39 | C3 | 1 | 96 | 24 |

The invention claimed is:

1. A compound of Formula (1) or a salt thereof:

$$A-N=N-D-N=N-B-N=N-A'$$ Formula (1)

wherein

A is an optionally substituted aryl, heteroaryl, non-aromatic heterocyclic or alkenyl group;

D is an optionally substituted, optionally metallised 1,8-dihydroxynaphthalene group;

B is an optionally substituted organic linking group; and

A′ is an optionally substituted pyrazolyl group which does not have an aromatic group as a substituent directly attached to either of the nitrogen atoms of the pyrazolyl ring.

2. A compound or salt as claimed in claim 1 wherein A is optionally substituted phenyl or naphthyl.

3. A compound or salt as claimed in claim 1 wherein A carries at least one sulpho group.

4. A compound or salt as claimed in claim 1 wherein D is of Formula (3) or a metal complex thereof:

Formula (3)

wherein a is 1 or 2.

5. A compound or salt as claimed in claim 1 wherein D is unmetallised.

6. A compound or salt as claimed in claim 1 wherein B is of Formula (7):

$$-L^1(-G-L^2)_x-$$ Formula (7)

wherein:

$L^1$ is a single covalent bond or an optionally substituted phenylene or naphthylene group;

$L^2$ is an optionally substituted phenylene or naphthylene group;

G is —O—, —NR²—, —N=N—, —NR²—CO—, —NR²—CO—, —NR²CONR²—, —S—, —SO—, —SO₂—, —SO₂NR²— or —CR²=CR²—, wherein each R² independently is H or $C_{1-4}$ alkyl; and x is 0, 1 or 2.

7. A compound or salt as claimed in claim 1 wherein B is an optionally substituted phenylene or naphthylene group.

8. A compound or salt as claimed in claim 1 wherein B carries at least one sulpho group.

9. A compound or salt as claimed in claim 1 wherein A′ is a pyrazolyl group of Formula (8a), (8b) or (8c):

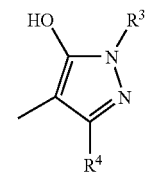
Formula (8a)

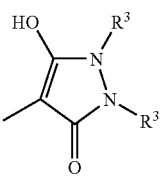
Formula (8b)

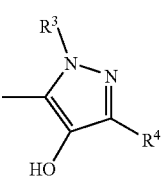
Formula (8c)

wherein
$R^3$, or each $R^3$ independently where there are two $R^3$ groups present, is H, optionally substituted alkyl, cyano, —COOR$^1$, —CONR$^1$R$^2$ or —COR$^1$;

$R^4$ is H, optionally substituted alkyl, optionally substituted alkoxy, optionally substituted aryl, optionally substituted heteroaryl, optionally substituted aryloxy, optionally substituted amino, halogen, cyano, hydroxyl, nitro, sulpho, phosphato, —COOR$^1$, OCOOR$^1$, OCOR$^1$, —COR$^1$, CONR$^1$R$^2$, OCONR$^1$R$^2$, —SR$^1$, —SO$_2$NR$^1$R$^2$, or —SO$_2$R$^1$; and $R^1$ and $R^2$ are each independently H or $C_{1-4}$ alkyl.

10. A compound or salt as claimed in claim 9 wherein $R^3$, or each $R^3$ independently where there are two $R^3$ groups present, is H or optionally substituted $C_{1-4}$ alkyl.

11. A compound or salt as claimed in claim 9 wherein $R^4$ is H, optionally substituted $C_{1-4}$ alkyl, COOH or CONH$_2$.

12. A compound or salt as claimed in claim 1 wherein:

A is optionally substituted phenyl, naphthyl, pyridyl or pyrazolyl;

D is of Formula (3) or a metal complex thereof:

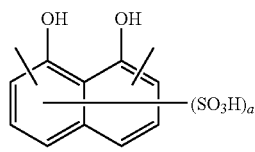
Formula (3)

wherein
a is 1 or 2;
B is of Formula (7):

-L$^1$(-G-L$^2$)$_x$-    Formula (7)

wherein:
L$^1$ is a single covalent bond or an optionally substituted phenylene or naphthylene group;
L$^2$ is an optionally substituted phenylene or naphthylene group;
G is —O—, —NR$^2$, —N=N—, —NR$^2$—CO—, —NR$^2$CONR$^2$—, —S—, —SO—, —SO$_2$—, —SO$_2$NR$^2$— or —CR$^2$=CR$^2$—, wherein each R$^2$ independently is H or $C_{1-4}$ alkyl; and
x is 0, 1 or 2; and A′ is a pyrazolyl group of Formula (8a), (8b) or (8c):

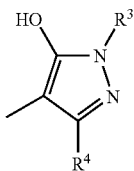
Formula (8a)

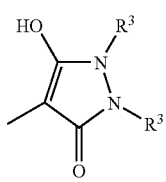
Formula (8b)

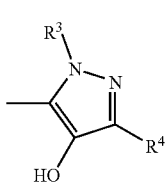
Formula (8c)

wherein
$R^3$, or each $R^3$ independently where there are two $R^3$ groups present, is H, optionally substituted alkyl, cyano, —COOR$^1$ or —COR$^1$; and $R^4$ is H, optionally substituted alkyl, optionally substituted alkoxy, optionally substituted aryl, optionally substituted heteroaryl, optionally substituted aryloxy, optionally substituted amino, halogen, cyano, hydroxyl, nitro, sulpho, phosphato, —COOR$^1$, —OCOOR$^1$, OCOR$^1$, —COR$^1$, —CONR$^1$R$^2$, —OCONR$^1$R$^2$, —SR$^1$, —SO$_2$NR$^1$R$^2$, or —SO$_2$R$^1$, wherein R$^1$ and R$^2$ are each independently H or $C_{1-4}$ alkyl.

13. A compound or salt as claimed in claim 12 wherein:

A is optionally substituted phenyl or naphthyl;

D is of Formula (4) or a metal complex thereof:

Formula (4)

[structure: naphthalene with OH, OH, methyl, HO$_3$S, SO$_3$H substituents]

B is optionally substituted phenylene or naphthylene group; and

A′ is a pyrazolyl group of Formula (8e):

Formula (8a)

[pyrazole structure with HO, R$^3$, R$^4$, methyl]

wherein:
R$^3$ is H or optionally substituted $C_{1-4}$ alkyl; and
R$^4$ is H, optionally substituted $C_{1-4}$ alkyl, COOH or CONH$_2$.

14. A compound or salt as claimed in claim 1 which is of Formula (9) or a salt thereof:

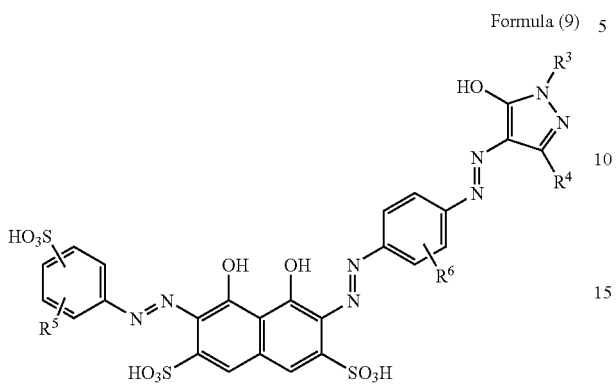

Formula (9)

wherein:
- $R^3$, or each $R^3$ independently where there are two $R^3$ groups present, is H, optionally substituted alkyl, cyano, —COOR$^1$ or —COR$^1$; and
- $R^4$ is H, optionally substituted alkyl, optionally substituted alkoxy, optionally substituted aryl, optionally substituted heteroaryl, optionally substituted aryloxy, optionally substituted amino, halogen, cyano, hydroxyl, nitro, sulpho, phosphato, —COOR$^1$, —OCOOR$^1$, —OCOR$^1$, —COR$^1$R$^2$, —OCONR$^1$R$^2$, —SR$^1$, —SO$_2$NR$^1$R$^2$, or —SO$^2$R$_1$, wherein $R^1$ and $R^2$ are each independently H or C$_{1-4}$ alkyl;
- $R^5$ and $R^6$ independently are selected from the group consisting of H, optionally substituted alkyl, optionally substituted alkoxy, optionally substituted aryl, optionally substituted heteroaryl, optionally substituted aryloxy, optionally substituted amino, halogen, cyano, hydroxyl, nitro, sulpho, phosphato, arylazo, —COOR$^1$, —OCOOR$^1$, —OCOR$^1$, —COR$^1$, —CONR$^1$R$^2$, —OCONR$^1$R$^2$, —SR$^1$, —SO$_2$NR$^1$R$^2$, and —SO$_2$R$^1$ where $R^1$ and $R^2$ are each independently H or C$_{1-4}$ alkyl.

15. A compound or salt as claimed in claim 14 which is of Formula (10) or a salt thereof:

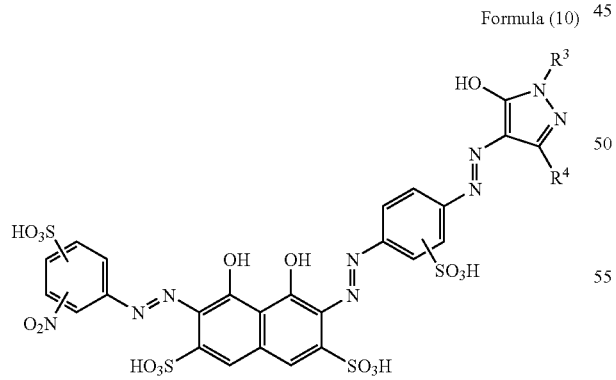

Formula (10)

- $R^3$, or each $R^3$ independently where there are two $R^3$ groups present, is H, optionally substituted alkyl, cyano, —COOR$^1$ or —COR$^1$; and
- $R^4$ is H, optionally substituted alkyl, optionally substituted alkoxy, optionally substituted aryl, optionally substituted heteroaryl, optionally substituted aryloxy, optionally substituted amino, halogen, cyano, hydroxyl, nitro, sulpho, phosphato, —COOR$^1$, —OCOOR$^1$—, —OCOR$^1$, —COR$^1$, —CONR$^1$R$^2$, —OCONR$^1$R$^2$, —SR$^1$, —SO$_2$NR$^1$R$^2$, or —SO$_2$R$^1$, wherein $R^1$ and $R^2$ are each independently H or C$_{1-4}$ alkyl.

16. A salt as claimed in claim 1 which is a lithium, sodium, potassium, ammonium or substituted ammonium salt or a mixed salt thereof.

17. A composition, which comprises:
(a) from 0.01 to 30 parts of a compound of Formula (1) or salt thereof:

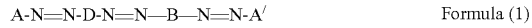

A-N=N-D-N=N—B—N=N-A′     Formula (1)

wherein
- A is an optionally substituted aryl, heteroaryl, non-aromatic heterocyclic or alkenyl group;
- D is an optionally substituted, optionally metallised 1,8-dihydroxynaphthalene group;
- B is an optionally substituted organic linking group; and
- A′ is an optionally substituted pyrazolyl group which does not have an aromatic group as a substituent directly attached to either of the nitrogen atoms of the pyrazolyl ring; and
  (b) from 70 to 99.99 parts of a liquid medium or a low melting point solid medium;
- wherein all pads are by weight and the number of parts of (a)+(b)=100.

18. A composition as darned in claim 17 wherein the liquid medium comprises water and an organic solvent and the composition is for use as an ink jet printing ink.

19. A process for printing an image on a substrate comprising applying thereto a composition comprising a liquid medium and a compound of Formula (1) or a salt thereof:

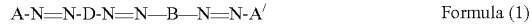

A-N=N-D-N=N—B—N=N-A′     Formula (1)

wherein
- A is an optionally substituted aryl, heteroaryl, non-aromatic heterocyclic or alkenyl group;
- D is an optionally substituted, optionally metallised 1,8-dihydroxynaphthalene group;
- B is an optionally substituted organic linking group; and
- A′ is an optionally substituted pyrazolyl group which does not have an aromatic group as a substituent directly attached to either of the nitrogen atoms of the pyrazolyl ring.

20. A process as claimed in claim 19 wherein the composition is applied by means of an ink jet printer.

21. A substrate printed with a composition as claimed in claim 18.

22. An ink jet printer cartridge, optionally refillable, comprising one or more chambers and a composition, wherein the composition is present in at least one of the chambers and the composition is a composition as claimed in claim 18.

23. An ink set, which comprises at least a black ink, a magenta ink, a cyan ink and a yellow ink, wherein the black ink comprises a compound or salt as claimed in claim 1.

* * * * *